(12) United States Patent
Jones

(10) Patent No.: US 6,892,391 B1
(45) Date of Patent: May 10, 2005

(54) DYNAMIC GENERATION OF VIDEO CONTENT FOR PRESENTATION BY A MEDIA SERVER

(76) Inventor: Stefan Jones, 2203 Hastings Dr. #24, Belmont, CA (US) 94002

(*) Notice: Subject to any disclaimer, the term of this patent is extended or adjusted under 35 U.S.C. 154(b) by 683 days.

(21) Appl. No.: 09/615,468

(22) Filed: Jul. 13, 2000

(51) Int. Cl.$^7$ ................................................ H04N 7/16
(52) U.S. Cl. ............................ 725/143; 725/97; 725/86; 348/180; 348/181
(58) Field of Search ...................... 725/86, 97, 46, 725/54, 91, 93, 114, 116, 135, 138, 143, 146, 144; 348/180, 181, 441, 589, 184, 192

(56) References Cited

U.S. PATENT DOCUMENTS

| | | | | |
|---|---|---|---|---|
| 5,274,445 A | * | 12/1993 | Overton et al. | 348/181 |
| 5,313,280 A | * | 5/1994 | Straus | 348/181 |
| 5,499,050 A | * | 3/1996 | Baldes et al. | 348/180 |
| 5,659,539 A | | 8/1997 | Porter et al. | 395/200.61 |
| 5,864,682 A | | 1/1999 | Porter et al. | 395/200.77 |
| 5,874,991 A | * | 2/1999 | Steinberg et al. | 348/181 |
| 5,920,340 A | * | 7/1999 | Man et al. | 348/181 |
| 6,057,882 A | * | 5/2000 | van den Branden Lambrecht et al. | 348/192 |
| 6,075,552 A | * | 6/2000 | Hasegawa | 725/116 |
| 6,119,154 A | | 9/2000 | Weaver et al. | 709/219 |
| 6,323,828 B1 | * | 11/2001 | Perez | 345/10 |
| 6,337,710 B1 | * | 1/2002 | Watkins | 348/180 |
| 6,772,437 B1 | * | 8/2004 | Cooper et al. | 725/111 |

* cited by examiner

*Primary Examiner*—Chris Grant
*Assistant Examiner*—Matthew R. Demicco
(74) *Attorney, Agent, or Firm*—Michael P. Straub; Straub & Pokotylo

(57) ABSTRACT

A method and apparatus is provided for dynamically generating digital video streams without an equivalent analog stream. The apparatus includes a configuration manager. The configuration manager presents configuration options to a user. User selections are recording as user preferences. The configuration manager is coupled to a media generator, which generates intermediate digital content based upon the user preferences. The media generator may be coupled to a local storage for storing electronic audio and visual information. The intermediate digital content is transferred to an encoder, which encodes the intermediate digital content to a digital format specified by in the user preferences.

3 Claims, 3 Drawing Sheets

DYNAMIC GENERATION OF VIDEO CONTENT FOR PRESENTATION BY A MEDIA SERVER

FIELD OF THE INVENTION

The present invention relates to a method and apparatus for processing audio-visual information, and more specifically, to a method and apparatus for dynamic digital content generation for presentation by a digital media server.

BACKGROUND OF THE INVENTION

In recent years, the media industry has adopted digital technologies to record and play numerous types of media, such as audio, still photographs, and moving video. The use of digital video has become increasingly prevalent in today's society. This phenomenon is not without warrant, as digital video provides numerous advantages over analog video. As users of the popular DVD format well know, digital video does not degrade from repeated use. Digital video can also either be delivered for presentation all at once, as when loaded by a DVD player, or delivered in a stream as needed. Today, digital media systems are available to deliver and present digital content to viewers in increasing numbers. However, the digital content needed to develop and test these digital media systems is in short supply.

Digital video is often first recorded in traditional analog form. It is encoded, or digitized, and compressed into a digital format that can be stored on disk and decoded during playback. For example, using techniques well understood by those in the art, a show broadcast over analog television may be converted into a digital format by using a device called an encoder.

However, while the practice of converting analog video presentations into digital form may be well understood, it is not practical for either testing or commercial purposes. The intellectual property rights of the original owners of the analog video must be respected, and only those individuals who have obtained the rights to the analog media presentation are authorized to use the converted digital presentation for private use.

During testing of a digital media system, it is necessary to have ample amounts of digital video to sufficiently test all components of the digital media system. Prior attempts to generate substantial amounts of digital content to facilitate system testing have met with limited success. As mentioned earlier, digitalizing analog video is cost prohibitive, due to the licensing of intellectual property. Also, as it was not originally contemplated for digital presentation, the content available in analog broadcasts is neither well suited nor of sufficient complexity to test the performance of a digital media system. Further, testing features such as fast forward or rewind is difficult at best without specific temporal information visible in the presentation. Such temporal information may include the time the presentation was encoded, the time the presentation was delivered by the server, and the time the presentation was received by the client. Without such information, it is difficult to determine the accuracy of a fast forward or rewind operation, or the lag time in the digital media system when delivering frames of video.

Content for digital media testing also needs to conform to certain standards. One popular standard for digital media is DVB, or Digital Video Broadcasting. DVB is a set of standards for transmitting compressed digitized video over broadcast industry transmission channels, such as cable, satellite, or terrestrial transmissions. Further information about the DVB standard may be obtained at the Internet web address "www.dvb.org". ATSC is another standard for transmitting video that is used primarily in digital high definition television (HDTV), standard definition television (SDTV), data broadcasting, multi-channel surround-sound audio, and satellite direct-to-home broadcasting. Further information on the ATSC standard may be found at the Internet web address "www.atsc.org".

Analog video may be encoded, or digitized, into a digital format conforming to the above standards through the use of an encoder. The set of standards that may be selectively implemented by the encoder during the digitization process are not limited to the above examples, and may include other standards such as MPEG-1, MPEG-2, real player, or AVI. As there are numerous digital media standards, and that number will likely only grow in the coming years, the need to generate content for a digital media system conforming to a variety of format standards will accordingly grow.

Current methods of generating test content for a digital media system have not met the needs of designers and testers of digital media systems. For example, one common method for generating a suite of test content involves the recording of original analog video, often time something as mundane as a stationary clock, with a standard VHS video recorder, and digitizing the resulting analog recording into a digital format. While this method does not require the licensing of intellectual property, as digitizing a segment of broadcast television would, it is still riddled with problems. First, as with any digitized analog recording, the cause of any fluctuation in the quality of digital video presentation cannot be isolated to the digital media system, as the problem could have arisen in the quality of the original analog video. Second, digital test content should test the constraints of the digital media system by being rich in color, sound, and moving objects. Such conditions are impractical to record in real life with a standard VHS video recorder. Third, without information identifying each frame of digital video, it is difficult to test scan operations as well as isolating delays in the digital media system in presenting digital video. While content in the video, such as the clock face, can be used to generally determine that a fast forward or rewind operation worked, it does not provide any frame specific information which is needed to accurately determine the success of a jump in time or isolate delays in presentation throughout the digital media system.

Another approach in obtaining test content is to use a selection of pre-generated digital samples, such as those available on the Internet. However, in addition to encountering the problems mentioned above of licensing intellectual property, and lacking frame specific information, these selections are typically of extremely short duration, which severely restricts their value in testing. Further, a suite of testing content should as much as possible exhaustively cover all the possible real world scenarios, which the small samplings of digital video available do not begin to address. Without varying the content in the digital content samples in the test suite, it is difficult to ensure that the full spectrum of problems that a digital video server may encounter have been tested. Additionally, each of these selections of pre-generated digital samples is fixed in one digital format, and will not serve the need to test multiple digital formats.

Given the inefficiencies of the current method of digital content generation and testing, there has been a long felt need, therefore, for a method or apparatus for generating original digital content that addresses the above needs for testing a digital media system. Such a method or system should allow one to configure the content of the digital video to test all components of the digital video system as well as encode the digital video in a variety of digital formats.

SUMMARY OF THE INVENTION

A method and apparatus for dynamically generating digital content is described. According to a primary aspect of the invention, a configuration manager presents configuration options to a user corresponding to the content of a digital video presentation. The configuration manager records selected configuration options as user preferences. The user preferences are transferred to a media generator, which generates intermediate video content according to the received user preferences. The generated intermediate video content is then transferred to an encoder, which encodes the intermediate video content into a digital format specified in the user preferences.

According to another aspect of the invention, the media generator may be operatively connected to a local storage, which houses digital picture stills, video, and sound. The configuration manager presents the user with the option to select digital picture stills, video, and sound housed in the local storage in generating the new digital content.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions shall be discussed under topic headings that appear in the following order:

I. HARDWARE OVERVIEW
II. FUNCTIONAL OPERATION
III. CONFIGURATION MANAGER
IV. MEDIA GENERATOR
V. SOFTWARE ENCODER

I. Hardware Overview

Figure 1:
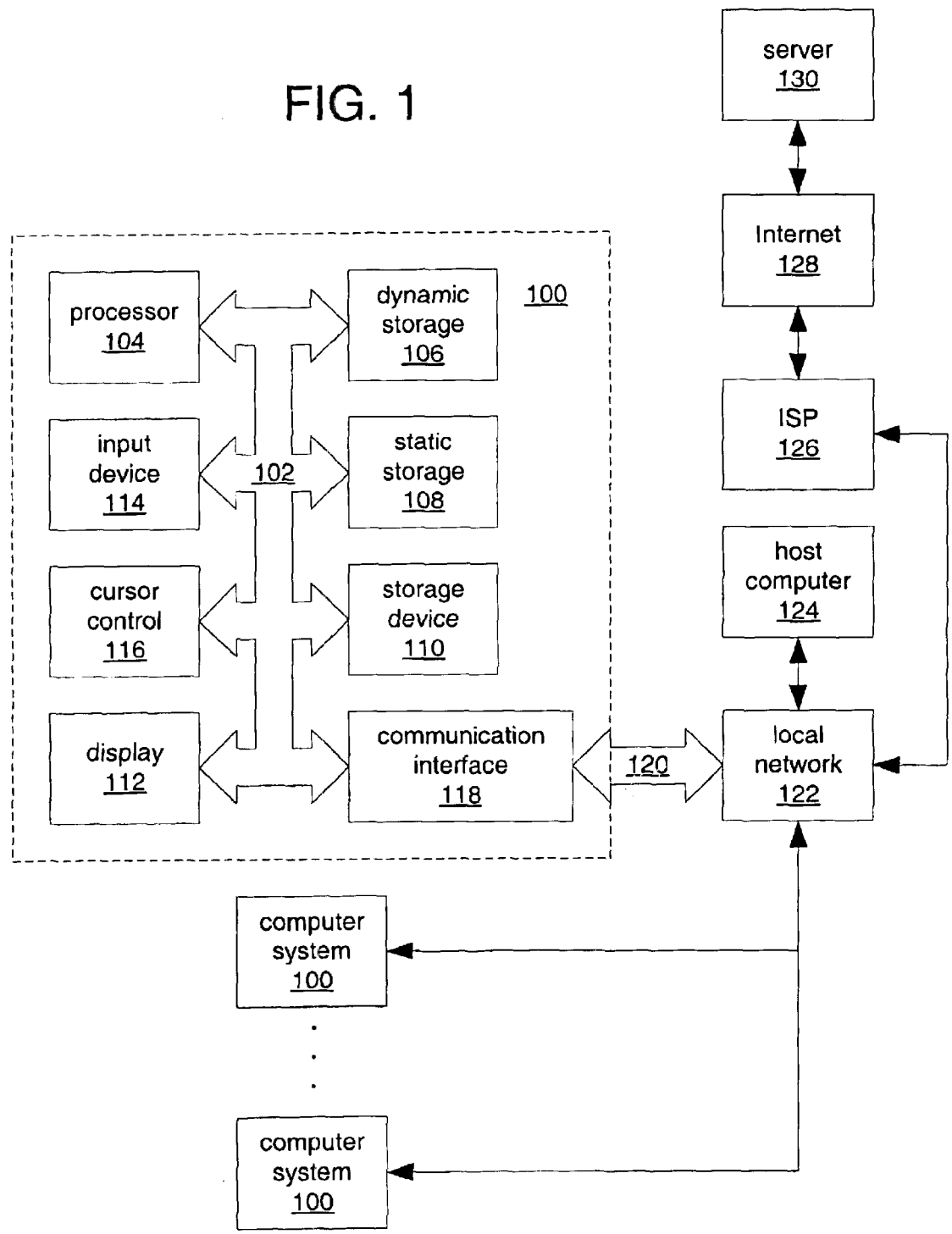
FIG. 1 is a block diagram that illustrates a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for generating a digital video content. According to one embodiment of the invention, a digital video content is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The execution of the sequences of instructions required to practice the invention need not be performed by a single computer system 100. The sequences of instructions required to practice the invention may be performed by a plurality of computer systems 100 connected to local network 122, connected to the Internet 128, or otherwise in data communication with each other.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit requested program code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Having thus described the physical environment upon which the invention maybe practiced, the functional overview of the invention will now be presented.

II. Functional Overview

Figure 2:
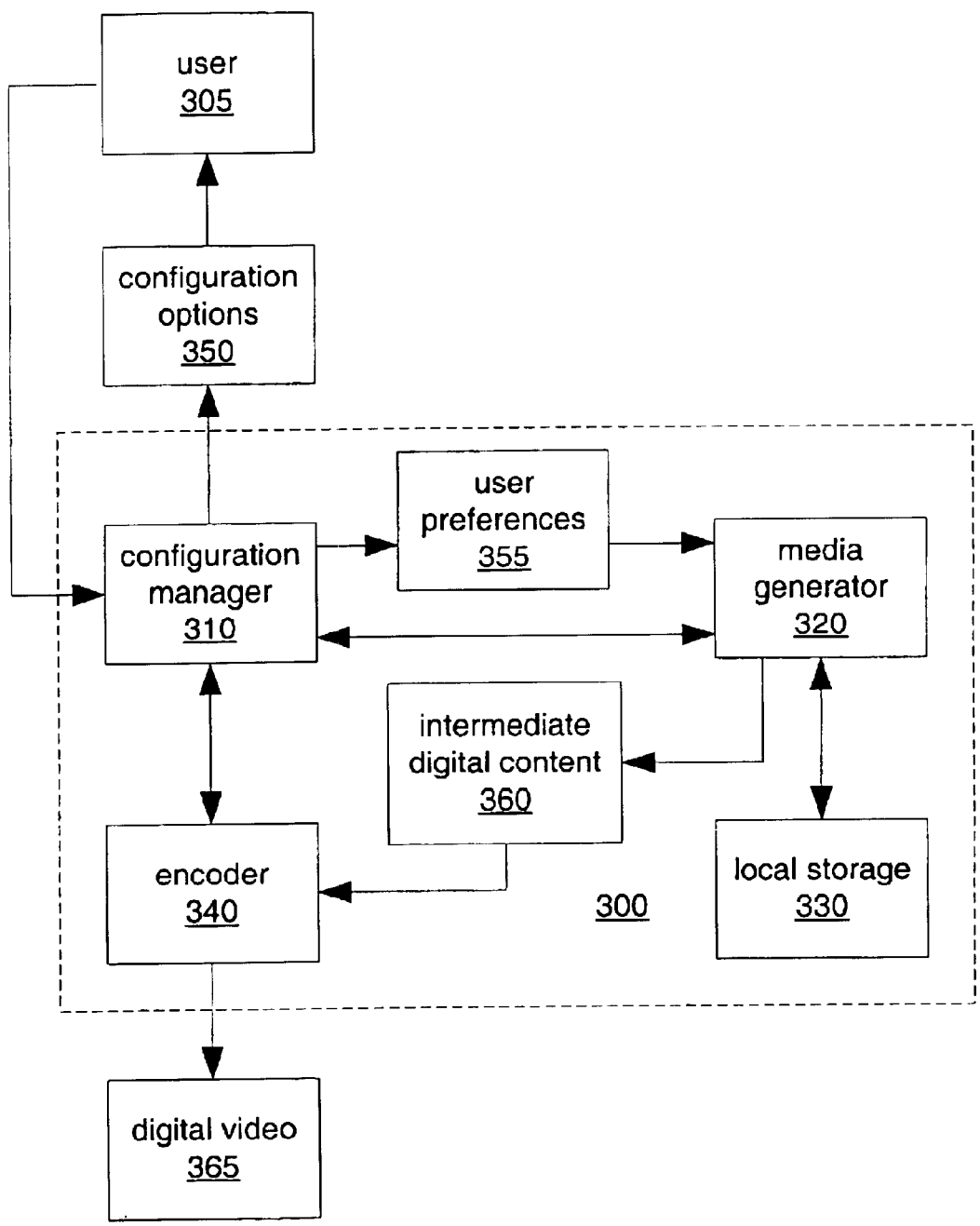
FIG. 2 is a block diagram illustrating the functional components of a digital media generator according to an embodiment of the present invention.

FIG. 2 is a block diagram illustrating a digital media generator 300 according to a principal aspect of the invention. As shown therein, a digital media generator 300 includes a configuration manager 310, a media generator 320, an optional local storage 330, and an encoder 340. A user 305 interacts with the digital media generator 300 through the configuration manger 310. The configuration manger 310 is responsible for presenting the user 305 with a list of configuration options 350 which correspond to a manner in which a segment of customized digital video 365 may be configured. The configuration manager 310 exchanges data with the media generator 320 and encoder 340 to determine to composition of the list of configuration options 350. The configuration manager 310 records the selection made by the user 305 from the list of configuration options 350 as user preferences 355, which are transmitted to the media generator 320.

The media generator 320 is responsible for generating intermediate digital content 360 based upon the user preferences 355. The media generator 320 may be coupled to local storage 330. The local storage 330 stores digital sounds, still pictures, and video which are used by the media generator 320 in generating intermediate digital content 360. Intermediate digital content 360 contains the desired content as selected by the user 305, however, it has yet to be encoded in the desired digital format. After the media generator 320 generates intermediate digital content 360, it is transferred, along with the user preferences 355, to the encoder 340. Intermediate digital content 360 may be transferred in real time, or asynchronously over a network link 120 or transferred via a portable storage device.

The encoder 340 is responsible for generating the segment of customized digital video 365 from intermediate digital content 360 based upon the format specified in the user preferences 355. The segment of customized digital video 365 may thereafter be used to test a digital media system.

After having now described the functional overview of the digital media generator 300 in general, the configuration manager 310, media generator 320, and encoder 340 will now each be explained in further detail in the following sections.

III. Configuration Manager

As previously explained, the configuration manger 310 is responsible for presenting the user 305 with a list of configuration options 350 which correspond to a manner in which the segment of customized digital video 365 may be configured. A typical list of configuration options 350 include, but are not limited to: altering the background in the video, altering the number of objects displayed in the video, altering the shape of the objects displayed in the video, altering the color of the shapes in the video, altering the velocity of the shapes in the video, altering the trajectory of the shapes in the video, including a sound track or tone pattern in the video, and including a timestamp in the video.

The user 305 may also indicate in the list of configuration options 350 time zones in which various parts of the system are simulated to operate. This information will be used by the media generator 320 to generate intermediate digital content 360 to test these conditions.

Additionally, to aid in the scan operations, the list of configuration options 350 may include rate control markers, which alter the background color briefly at set time intervals.

The list of configuration options 350 is generated by the configuration manager 310 based upon information received from the media generator 320 about the current capability of the media generator 320 to generate digital video and information received from the encoder 340 on the types available digital formats supported by the encoder 340. The configuration manager 310 should be updated when there is a change in the capacity of either the media generator 320 to generate digital video or the encoder 340 to support new digital formats. For example, such a change in the media generator 320 may include additional sound or video information stored with the local store 330 that can be selected by the user 305 in generating intermediate digital content 360.

The list of configuration options 350 may be presented to the user through any graphical user interface, such as an Internet web page or those used by common personal computer software and operating systems. The list of configuration options 350 may be transmitted to the user over any communication medium, such as the Internet or a proprietary Intranet. The list of configuration options 350 may be saved by the user 305, and at a later date be loaded, edited, and saved again.

The configuration manager 310 records selections made by the user 305 from the list of configuration options 350 as user preferences 355. The user preferences 355 are transmitted to the media generator 320 when the user 305 indicates that video is to be generated.

IV. Media Generator

The media generator 320 is responsible for generating intermediate digital content 360 based upon the user preferences 355. Intermediate digital content 360 is a series of uncompressed simple graphics (typically a series of bitmap files) that contain the characteristics indicated in the user preferences 355. The intermediate digital content 360 may additionally contain sound if indicated in the user preferences 355. The media generator 320 may optionally be operatively connected to a local storage 330, which houses digital sounds, still pictures, and video. The local storage 330 can be any component well known to those in the art for storing electronic information, such as a database.

Figure 3:
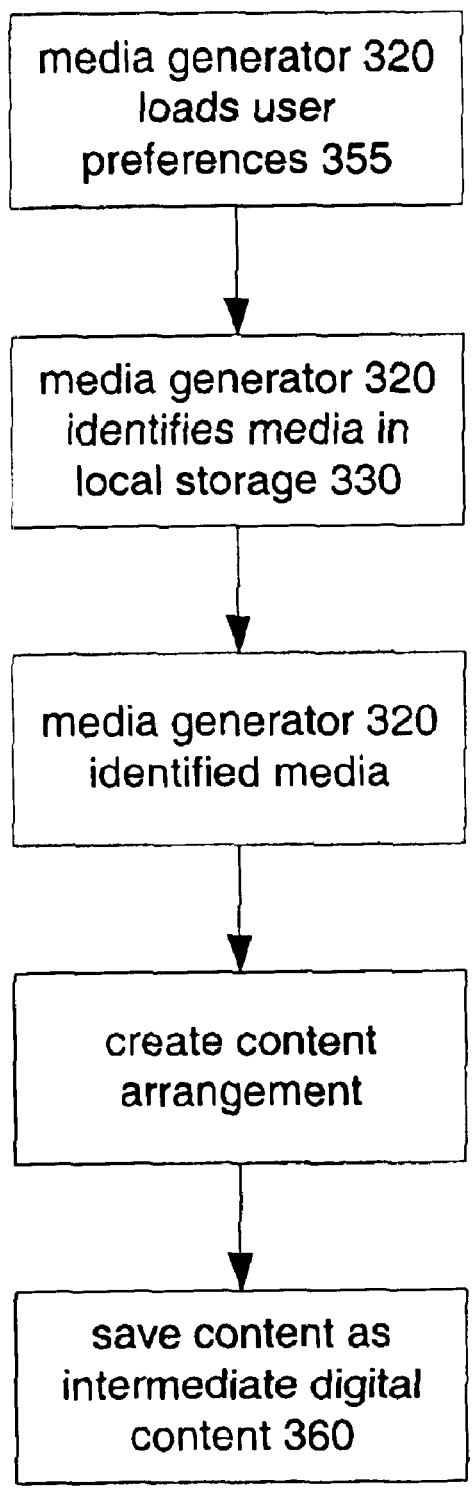
FIG. 3 is a flow chart illustrating the steps of generating intermediate digital content.

As FIG. 3 illustrates, the media generator 320 loads the user preferences 355. Next, the digital sounds, still pictures, and video needed to satisfy the requirements of the user preferences 355 stored in local storage 330 are identified by the media generator 320. Next, the media generator 320 loads the identified digital sounds, still pictures, and video. Once loaded, the media generator 320 uses these digital sounds, still pictures, and video to create the content arrangement specified in the user preferences 355. In addition to incorporating the sounds, still pictures, and video from local storage 330, the media generator can construct digital content in any of the well known methods in the art, such as changing background color, incorporating and manipulating text, generating shapes and figures, and other such functionality typical of graphics manipulation software packages, such as AutoCad by AutoDesk, Inc. or Corel Draw by Corel Corporation.

The media generator 320 may also include functionality to synthesize or generate sound dynamically according to input from the user 305. The configuration manager 310 may present the user 305 configuration options 350 to dynamically generate or record sound. The generated sound may be stored in the local storage 305 and used by the encoder 340 in the generation of the segment of customized digital video 365.

Finally, the content arrangement is saved by the media generator 320 as intermediate digital content 360. The intermediate digital content 360 can be saved in any format that the encoder 340 can read, such as a series of bitmap files.

The media generator 320 may use a system clock to place a visible timestamp in the intermediate digital content 360. This would allow testers of the digital media system to visually inspect the digital video during normal play and seek operations to ensure proper functioning of the digital media system.

According to one embodiment of the present invention, the intermediate digital content 360 is of a fixed length. The intermediate digital content 360 may be transferred to the encoder 340 immediately or saved for transfer at a later date. In another embodiment, the intermediate digital content 360 has no fixed length, and is continually generated by the media generator 320. In this case the encoder 340 encodes the intermediate digital content 360 as it is received in real time.

V. Encoder

The encoder 340 is responsible for generating the segment of customized digital video 365 from the segment of intermediate digital video 360 based upon the format specified in the user preferences 355. This format may be of any form. For example, the encoded format may include MPEG-1, MPEG-2, MPEG-4, AVI, or QuickTime, the DVB standard, or the ATSC standard.

A suitable encoder for use in the present invention is MegaPEG from Digigami, Inc. located physically in San Diego, Calif., and on the Internet at "www.digigami.com". Another suitable encoder for use in the present invention is Light Speed MPEG Encoder from Ligos Technology located physically in San Francisco, Calif., and on the Internet at "www.ligos.com".

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating a digital video stream, comprising:

loading user preferences corresponding to a manner in which the digital video stream is to be configured, wherein the user preferences include a plurality of time zones in which various parts of a system that is to be tested with the digital video stream may be simulated to operate in;

identifying media required by a media generator to satisfy the user preferences;

loading said media;

using said media to generate intermediate digital content based on the user preferences;

transferring the intermediate digital content to an encoder; and encoding said intermediate digital content into said digital video stream.

2. A computer-readable medium carrying one or more sequences of instructions for presenting dynamic content from a server to a client, wherein execution of the one or more sequences of instructions by one or more processors causes the one or more processors to perform the steps of:

loading user preferences corresponding to a manner in which the digital video stream is to be configured, wherein the user preferences include a plurality of time zones in which various parts of a system that is to be tested with the digital video stream may be simulated to operate in; identifying media required by a media generator to satisfy the user preferences; loading said media; generating intermediate digital content based on the user preferences; transferring the intermediate digital content to an encoder; and encoding same intermediate digital content into said digital video stream.

3. A system for generating digital content, comprising: a means for loading user preferences corresponding to a manner in which the digital video stream is to be configured, wherein the user preferences include a plurality of time zones in which various parts of a system that is to be tested with the digital video stream may be simulated to operate in; a means for identifying media required by a media generator to satisfy the user preferences; a means for loading said media; a means for generating said digital content based upon the user preferences; and a means for encoding said digital content based upon the user preferences.

* * * * *